United States Patent
Jones

(10) Patent No.: US 10,824,935 B2
(45) Date of Patent: Nov. 3, 2020

(54) SYSTEM AND METHOD FOR DETECTING ANOMALIES IN VIDEO USING A SIMILARITY FUNCTION TRAINED BY MACHINE LEARNING

(71) Applicant: Mitsubishi Electric Research Laboratories, Inc., Cambridge, MA (US)

(72) Inventor: Michael Jones, Belmont, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 122 days.

(21) Appl. No.: 16/162,568

(22) Filed: Oct. 17, 2018

(65) Prior Publication Data
US 2020/0125923 A1    Apr. 23, 2020

(51) Int. Cl.
G06N 3/04 (2006.01)
G06K 9/00 (2006.01)
G06N 3/08 (2006.01)

(52) U.S. Cl.
CPC ....... *G06N 3/0418* (2013.01); *G06K 9/00744* (2013.01); *G06K 9/00758* (2013.01); *G06N 3/08* (2013.01)

(58) Field of Classification Search
CPC .... G06N 3/0418; G06N 3/08; G06K 9/00744; G06K 9/00758
See application file for complete search history.

(56) References Cited

U.S. PATENT DOCUMENTS

| | | | | |
|---|---|---|---|---|
| 5,666,157 A | * | 9/1997 | Aviv ............... | G08B 13/19602 348/150 |
| 7,376,246 B2 | * | 5/2008 | Shao ................ | G06K 9/3216 382/103 |
| 8,781,183 B2 | * | 7/2014 | Porikli ............. | G06K 9/00 382/128 |
| 9,697,614 B2 | * | 7/2017 | Mansour .......... | G06K 9/00 |
| 2009/0016610 A1 | * | 1/2009 | Ma .................. | G06K 9/00771 382/195 |
| 2019/0097805 A1 | * | 3/2019 | Shin ................. | H04L 9/3228 |

(Continued)

OTHER PUBLICATIONS

Event-Coupled Hidden Markov Models (Year: 2000).*
(Continued)

*Primary Examiner* — Nizar N Sivji
(74) *Attorney, Agent, or Firm* — Gennadiy Vinokur; Hironori Tsukamoto; James McAleenan

(57) ABSTRACT

A system for video anomaly detection includes an input interface configured to accept an input video of a scene, and a memory configured to store training video patches of a training video of the scene capturing normal activity in the scene, and store a neural network trained to compare two video patches to declare the compared video patches as similar or dissimilar. The system also includes a processor configured to partition the input video into input video patches, compare, using the neural network, each input video patch with corresponding training video patches retrieved from the memory to determine if each input video is similar to at least one corresponding training video patch, and declare an anomaly when at least one input video patch is dissimilar to all corresponding training video patches.

14 Claims, 7 Drawing Sheets

(56) References Cited

U.S. PATENT DOCUMENTS

2019/0375420 A1* 12/2019 Hou .................... G05D 1/0214

OTHER PUBLICATIONS

Dattaraj et al., "Siamese Neural Networks for one shot detection of railway track switches," Dec. 21, 2017, retrieved from internet: https://arxiv.org/ftp/arxiv/papers/1712/1712.08036.pdf retrieved Sep. 17, 2019.

"Detection of Unknown Anomalies in Streaming Videos with Generative Energy-based Boltzmann Models" (NPL, Author. Hung Vu, Tu Dinh Nguyen and Dinh Phung, Pub Date: Sep. 29, 2018 ).

Hasan et al., "Learning Temporal Regularity in Video Sequences." Apr. 15, 2016, Computer Science > Computer Vision and Pattern Recognition. arxiv.org.

Kratz et al., "Anomaly Detection in Extremely Crowded Scenes Using Spatio-Temporal Motion Pattern Models." 2009 IEEE Conference on Computer Vision and Pattern Recognition Jun. 20-25, 2009, Miami, FL, USA.

Lu et al. "Abnormal Event Detection at 150 FPS in MATLAB." 2013 IEEE International Conference on Computer Vision, Dec. 1-8, 2013 , Sydney, NSW, Australia.

* cited by examiner

SYSTEM AND METHOD FOR DETECTING ANOMALIES IN VIDEO USING A SIMILARITY FUNCTION TRAINED BY MACHINE LEARNING

TECHNICAL FIELD

This invention relates generally to computer vision and more particularly to detecting motion anomalies in video.

BACKGROUND

Closed circuit television (CCTV) is widely used for security, transport and other purposes. Example applications include the observation of crime or vandalism in public open spaces or buildings (such as hospitals and schools), intrusion into prohibited areas, monitoring the free flow of road traffic, detection of traffic incidents and queues, detection of vehicles travelling the wrong way on one-way roads.

The monitoring of CCTV displays (by human operators) is a very laborious task however and there is considerable risk that events of interest may go unnoticed. This is especially true when operators are required to monitor a number of CCTV camera outputs simultaneously. As a result, in many CCTV installations, video data is recorded and only inspected in detail if an event is known to have taken place. Even in these cases, the volume of recorded data may be large and the manual inspection of the data may be laborious. Consequently, there is a need for automatic devices to process video images to detect when there is an event of interest. Such a detection is referred herein as a video anomaly detection and can be used to draw the event to the immediate attention of an operator, to place an index mark in recorded video and/or to trigger selective recording of CCTV data.

The problem of video anomaly detection is to automatically detect activity in part of a video that is different from activities seen in normal (training) video of the same scene. For example, the video may be of a street scene with people walking along a sidewalk. Anomalous activity to be detected might be people fighting or climbing over a fence.

There have been various approaches to the video anomaly detection problem published in the computer vision literature. One class of approaches typified by the paper, "Learning Temporal Regularity in Video Sequences" by Hasan et al. (CVPR 2016) uses a convolutional neural network autoencoder to learn the typical appearances and motions that occur in the training video. The autoencoder learns to reconstruct typical windows of the training video. To detect anomalies, the autoencoder is used to reconstruct windows of the testing video. Frames with high reconstruction error are flagged as anomalous. The main drawback of this method is that rare but normal activity that occurs in the training video is not well modeled which results in lots of false positive anomaly detections in testing videos.

Another class of approaches is typified by the paper, "Abnormal Event Detection at 150 FPS in MATLAB", by C. Lu et al. (ICCV 2013) is based on reconstructing a feature vector computed from part of an input video from feature vectors of the training video. However, this class of approaches is error-prone and computationally expensive and also can miss rare but normal activity that occurs in the training video.

A third class of approaches to video anomaly detection models the probability distribution of features of the video. "Anomaly Detection in Extremely Crowded Scenes Using Spatio-Temporal Motion Pattern Models" by Kratz and Nishino (CVPR 2009) is an example of this approach. However, this approach can also miss the rare but normal activity that occurs in the training video.

Accordingly, there is still a need for a system and a method for detecting motion anomalies in the input video capable of distinguishing rare but normal activities in a scene from abnormal activities.

SUMMARY

It is an object of some embodiments to analyze input video of a scene acquired by a fixed, static camera in order to detect automatically an abnormal activity in the scene. A typical scene that is of interest for surveillance can include virtually unlimited number of motion variations that is considered normal for that scene. To that end, it can be impractical to compare the acquired video of the scene with all possible variation of the normal motion of the scene to detect anomalies in the video. A number of anomaly detection methods consider this not as a problem but as a fact of life. To that end, various anomaly detection methods aim to come up with an aggregation of the normal motion in the scene and use that aggregation in the anomaly detection. However, the computation of the motion aggregation can be expensive, the motion aggregation can fail to recognize rare but normal motion in the scene, or both.

It is an object of some embodiments to use direct comparison between the activities in the input video and the activities in the training video for anomaly detection. Such a direct comparison, e.g., the comparison based on Euclidean distance, is computationally efficient and can consider even rare normal motions. For example, if usual normal activity on the street is walking, the aggregation-based methods can distinguish walking from falling. However, if the normal activity includes a motion of a person tying her shoelaces, the aggregation-based methods would consider that motion as an anomaly even if the activity of tying shoes is occasionally present in the training video. In contrast, the direct distance computation methods can recognize this tying shoes activity as normal, if such type of activity is present in the training video.

Some embodiments are based on recognition that the advancement of artificial intelligence, such as artificial neural networks, can simplify computational requirements of direct comparison between the activities in the input video and the activities in the training video for anomaly detection. Artificial neural networks (ANN) or connectionist systems are computing systems vaguely inspired by the biological neural networks that constitute animal brains. The neural network systems can process complex data inputs. Such systems "learn" to perform tasks by considering examples, generally without being programmed with any task-specific rules. To that end, it is tempting to provide such a neural network based system for direct comparison of activities in input and training videos for automatic anomaly detection. In theory, such a trained neural network can provide an anomaly detector suitable for direct comparison of the activities with practical computation and memory requirements suitable, e.g., for closed circuit television (CCTV) systems.

To that end, one approach to detecting anomalies in video is to train a classifier from examples to classify each part of a video as normal or abnormal. To do this the classifier has to be trained with videos describing normal and abnormal activity. However, the videos of the normal activity are typically readily available, while the videos of abnormal activity are typically not available. Having data for only normal examples does not allow training the classifier because a classifier cannot learn a class that it has never seen. Moreover, some embodiments are based on the recognition that there are a large number of variations of abnormal activity all of which occur very rarely and are thus very difficult and expensive to collect. Any attempt to capture videos with even a subset of variations of the abnormal activity sufficient to train a classifier is fruitless.

Some embodiments are based on the realization that normal video is easily collected and video capturing normal activity can be considered complete. This means that activity variations in the training video not only represent different types of the normal activity, they represent normal activity itself. In such a manner, an activity variation present in the training video can be considered normal, while a variation absent from the training video can be considered abnormal.

Armed with this understanding, some embodiments train and/or use a neural network not to classify the abnormal vs. normal activity, but to compare video patches of a video of a scene. A video patch includes all of the pixels contained in a spatio-temporal region of a video. In such a manner, instead of providing to a neural network one video patch to classify that video patch as normal or abnormal, the embodiments submit to the neural network two video patches to compare. One video patch is from a database of normal activity and another video patch is from an input video that needs to be classified as normal or abnormal. The input video patch absent from the database of normal activity represents an abnormal activity. In such a manner, some embodiments provide a detector for abnormal and normal activity that is based on a classifier trained not to classify a video patch as normal or abnormal, but rather trained to classify two video patches as similar or dissimilar. Training a similar/dissimilar classifier does not require examples of anomalous activity.

Some embodiments are based on another realization that the neural network itself can be further used to improve the database of normal activity. Specifically, in some embodiments, the database of normal activity includes only unique video patches, i.e., any two training video patches compared with the neural network are dissimilar. To that end, some embodiments remove video patches from the database of normal activity, such that all remaining video patches are dissimilar to each other and each removed video patch is similar to at least one remaining video patch. In such a manner, the memory requirement for storing the database of normal activity can be reduced without reducing the accuracy of anomaly detection.

In addition, some embodiments are based on the realization that a manner to extract features from videos to be compared can be also performed by a neural network. Additionally, or alternatively, some embodiments use the same neural network trained to compare video patches for extracting features from video frames that are advantageous for comparison. In such a manner, this neural network can be trained in end-to-end fashion for both feature extraction and feature comparison, which can increase the accuracy of the video comparison.

Accordingly, one embodiment discloses a system for video anomaly detection. The system includes an input interface configured to accept an input video of a scene; a memory configured to store training video patches of a training video of the scene capturing normal activity in the scene, and store a neural network trained to compare two video patches to declare the compared video patches as similar or dissimilar; and a processor configured to partition the input video into input video patches; compare, using the neural network, each input video patch with corresponding training video patches retrieved from the memory to determine if each input video is similar to at least one corresponding training video patch; and declare an anomaly when at least one input video patch is dissimilar to all corresponding training video patches.

Another embodiment discloses a method for video anomaly detection, wherein the method uses a processor coupled with stored instructions implementing the method, wherein the instructions, when executed by the processor carry out steps of the method, that includes accepting an input video of a scene; retrieving from the memory training video patches of a training video of the scene capturing normal activity in the scene; retrieving from the memory a neural network trained to compare two video patches to declare the compared video patches as similar or dissimilar; partitioning the input video into input video patches; comparing, using the neural network, each input video patch with corresponding training video patches retrieved from the memory to determine if each input video is similar to at least one corresponding training video patch; and declaring an anomaly when at least one input video patch is dissimilar to all corresponding training video patches.

Yet another embodiment discloses a non-transitory computer readable storage medium embodied thereon a program executable by a processor for performing a method, the method includes accepting an input video of a scene; retrieving training video patches of a training video of the scene capturing normal activity in the scene; retrieving a neural network trained to compare two video patches to declare the compared video patches as similar or dissimilar; partitioning the input video into input video patches; comparing, using the neural network, each input video patch with corresponding training video patches retrieved from the memory to determine if each input video is similar to at least one corresponding training video patch; and declaring an anomaly when at least one input video patch is dissimilar to all corresponding training video patches.

DETAILED DESCRIPTION

Figure 1:
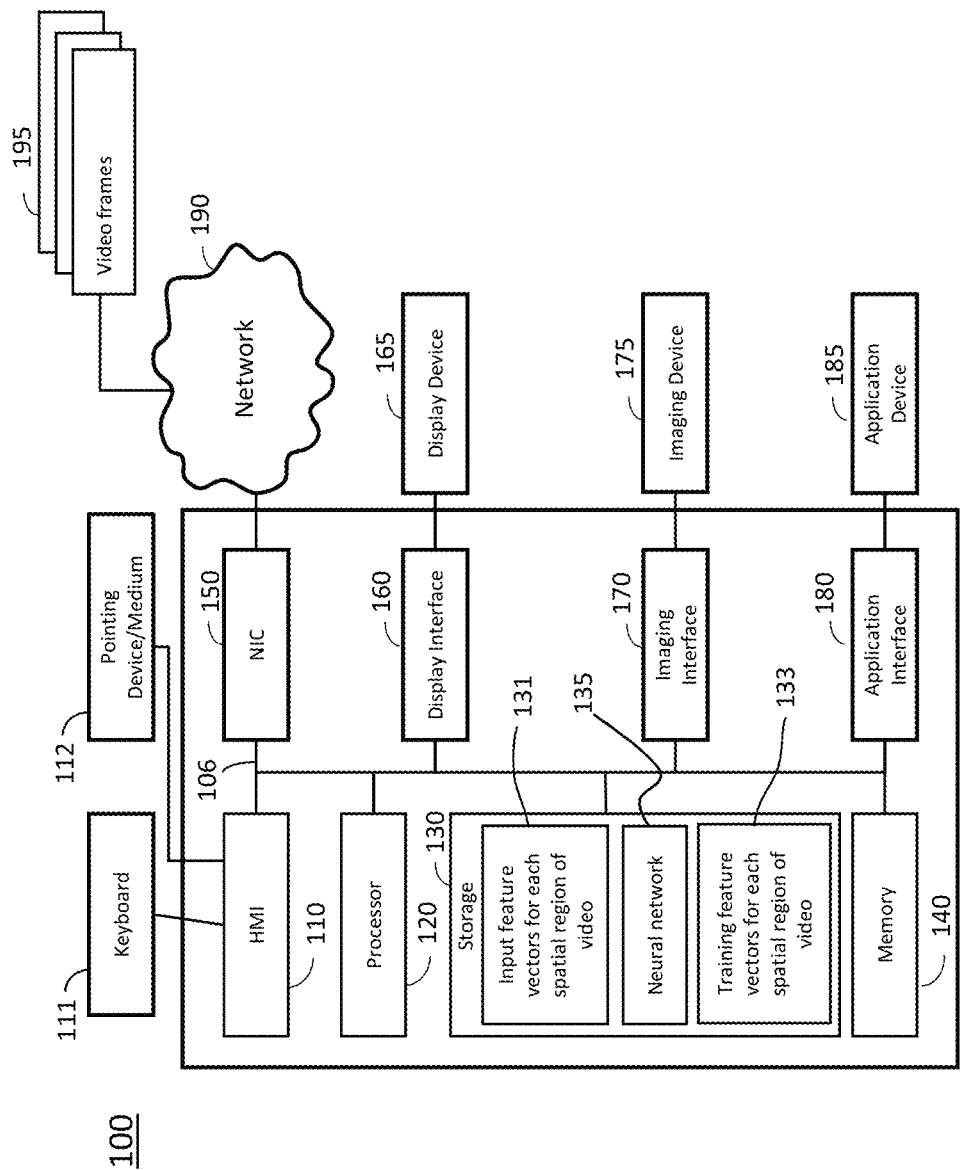
FIG. 1 shows a block diagram of an image processing system for detecting anomalies in videos in accordance with some embodiments.

FIG. 1 shows a block diagram of an image processing system 100 for detecting anomalies in videos coining from a fixed, static camera in accordance with some embodiments. The image processing system 100 includes a processor 120 configured to execute stored instructions, as well as a memory 140 that stores instructions that are executable by the processor. The processor 120 can be a single core processor, a multi-core processor, a computing cluster, or any number of other configurations. The memory 140 can include random access memory (RAM), read only memory (ROM), flash memory, or any other suitable memory systems. The processor 120 is connected through a bus 106 to one or more input and output devices. These instructions implement a method for detecting anomalies in a video sequence.

In various embodiments, the anomaly detection produces a set of bounding boxes indicating the locations and sizes of any anomalies in each video frame. The image processing system 100 is configured to detect anomalies in a video using a neural network 135 trained to compare two video patches to declare the compared video patches as similar or dissimilar. Using the neural network 135, the imaging system 100 implements an anomaly detector that compares video patches of the input video of a scene to video patches of the training video of the same scene to declare anomalies when a patch of input video is dissimilar to all or corresponding patches in the training video. For example, a storage device 130 can be adapted to store the sets of video patches extracted from different parts of training and/or input video frames. The storage device 130 can be implemented using a hard drive, an optical drive, a thumb drive, an array of drives, or any combinations thereof.

In some implementations, a human machine interface 110 within the image processing system 100 connects the system to a keyboard 111 and pointing device 112, wherein the pointing device 112 can include a mouse, trackball, touchpad, joy stick, pointing stick, stylus, or touchscreen, among others. The image processing system 100 can be linked through the bus 106 to a display interface 160 adapted to connect the image processing system 100 to a display device 165, wherein the display device 165 can include a computer monitor, camera, television, projector, or mobile device, among others.

The image processing system 100 can also be connected to an imaging interface 170 adapted to connect the system to an imaging device 175. In one embodiment, the frames of input video on which the anomaly detector is run are received from the imaging device. The imaging device 175 can include a video camera, computer, mobile device, webcam, or any combination thereof.

In some embodiments, the image processing system 100 is connected to an application interface 180 through the bus 106 adapted to connect the image processing system 100 to an application device 185 that can operate based on results of anomaly detection. For example, the device 185 is a surveillance system that uses the locations of detected anomalies to alert a security guard to investigate further.

A network interface controller 150 is adapted to connect the image processing system 100 through the bus 106 to a network 190. Through the network 190, the video frames 195, e.g., frames of the normal or training patches of video 133 and/or input or testing patches of video 131 can be downloaded and stored within the computer's storage system 130 for storage and/or further processing. In some embodiments, the training and input patches of videos are stored as a set of features extracted from the corresponding patches. In such a manner, the storage requirements can be reduced, while improving subsequent processing of the videos.

Figure 2:
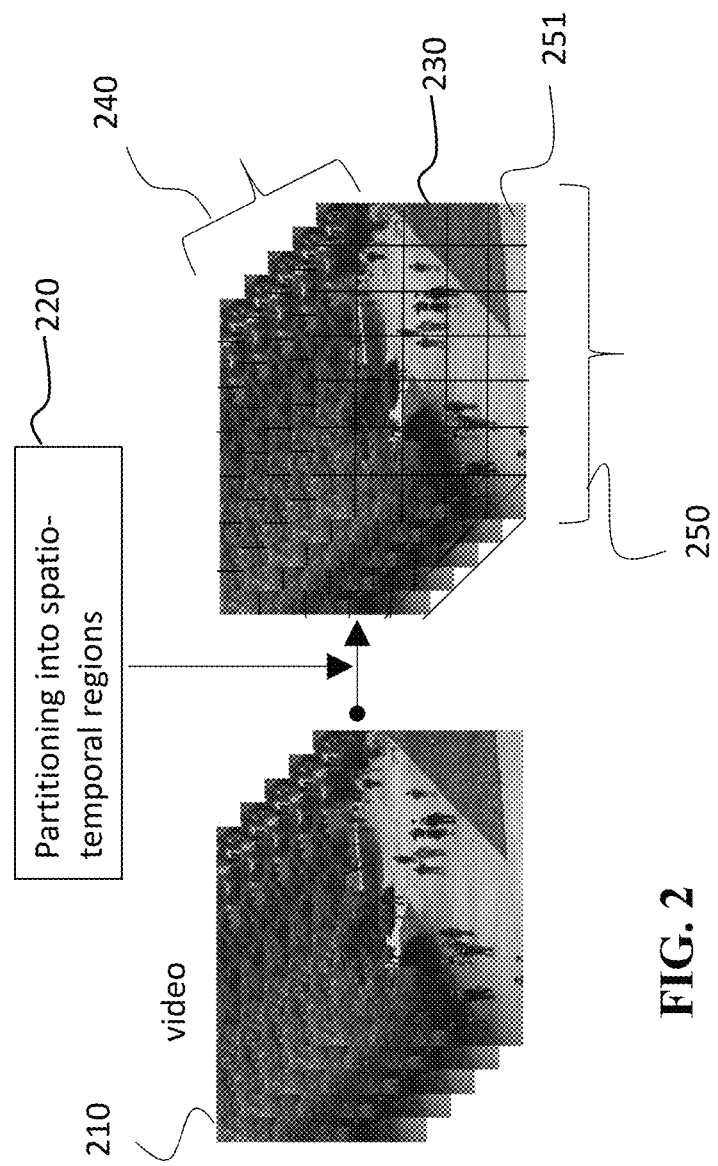
FIG. 2 shows an example of partitioning frames of video into a set of spatio-temporal patches according to some embodiments.

FIG. 2 shows an example of partitioning 220 frames of video 210 into a set of spatio-temporal patches 230. Each spatio-temporal patch, e.g., a patch 251, is defined in space and time by a spatial dimension 250 defining a region of the spatio-temporal patch in each video frame and a temporal dimension 240 defining a number of video frames forming the spatio-temporal patch. The video 210 can be an input video 131 and/or a training video 133. As used herein, a training video patch and an input video patch of the same region are corresponding to each other.

Various embodiments can use different spatio-temporal partitions of the video of the scene to define the video patches. However, in various implementations, the spatio-temporal partitions of the input video are identical to the spatio-temporal partitions of the training video to streamline the comparison. Partitioning videos into patches and extracting features from the patches simplify anomaly detection.

It is an object of some embodiments to use direct comparison between the activities in the input video and the activities in the training video for anomaly detection. Such a direct comparison, e.g., the comparison based on Euclidean distance, is computationally efficient and can consider even rare normal motions. For example, if usual normal activity on the street is walking, the aggregation-based methods can distinguish walking from falling. However, if the normal activity includes a motion of a person tying her shoelaces, the aggregation-based methods would consider that motion as an anomaly even if the activity of tying shoes is occasionally present in the training video. In contrast, the direct distance computation methods can recognize this tying shoes activity as normal, if such type of activity is present in the training video.

Some embodiments are based on recognition that the advancement of artificial intelligence, such as artificial neural networks, can simplify computational requirements of direct comparison between the activities in the input video and the activities in the training video for anomaly detection. Artificial neural networks (ANN) or connectionist systems are computing systems vaguely inspired by the biological neural networks that constitute animal brains. The neural network systems can process complex data inputs. Such systems "learn" to perform tasks by considering examples, generally without being programmed with any task-specific rules. To that end, it is tempting to provide such a neural network based system for direct comparison of activities in input and training videos for automatic anomaly detection. In theory, such a trained neural network can provide an anomaly detector suitable for direct comparison of the activities with practical computation and memory requirements suitable, e.g., for closed circuit television (CCTV) systems.

To that end, one approach to detecting anomalies in video is to train a classifier from examples to classify each part of a video as normal or abnormal. To do this the classifier has to be trained with videos describing normal and abnormal activity. However, the videos of the normal activity are typically readily available, while the videos of abnormal activity are typically not available. Having data for only normal examples does not allow training the classifier because a classifier cannot learn a class that it has never seen. Moreover, some embodiments are based on the recognition that there are a large number of variations of abnormal activity all of which occur very rarely and are thus very difficult and expensive to collect. Any attempt to capture videos with even a subset of variations of the abnormal activity sufficient to train a classifier is fruitless.

Some embodiments are based on the realization that normal video is easily collected and video capturing normal activity can be considered complete. This means that activity variations in the training video not only represent different types of the normal activity, they represent normal activity itself. In such a manner, an activity variation present in the training video can be considered normal, while a variation absent from the training video can be considered abnormal.

Armed with this understanding, some embodiments train and/or use a neural network not to classify the abnormal vs. normal activity, but to compare video patches of a video of a scene. A video patch includes all of the pixels contained in a spatio-temporal region of a video. In such a manner, instead of providing to a neural network one video patch to classify that video patch as normal or abnormal, the embodiments submit to the neural network 135 two video patches to compare. One video patch is from a database of normal activity and another video patch is from an input video that needs to be classified as normal or abnormal. The input video patch absent from the database of normal activity represents an abnormal activity. In such a manner, some embodiments provide a detector for abnormal and normal activity that is based on a classifier trained not to classify a video patch as normal or abnormal, but rather trained to classify two video patches as similar or dissimilar. Training a similar/dissimilar classifier does not require examples of anomalous activity.

Specifically, some embodiments are based on the realization that detecting anomalous parts of a testing video can be accomplished by comparing each part of the testing video (i.e. each spatio-temporal region) to all of the normal training video within the same spatial region. It is advantageous to compare the testing video to the normal training video within the same spatial region because normal activity depends on the location. For example, a person walking along a sidewalk is normal, but a person walking in the middle of the street or on top of a car is usually anomalous. Thus the problem of anomaly detection can be reduced to the problem of comparing video patches from the testing video to video patches from the normal training video. However, a manner for comparing two video patches needs to be determined. For example, what features of the video patches should be used for comparison? What distance function should be used?

Some embodiments are based on the realization that the answer to these questions is best learned from examples by a neural network rather than designed by hand by a computer programmer. Thus, in some embodiments a neural network is trained to take two video patches as input and to output a distance between the video patches. The training set of example video patch pairs is created so that similar video patch pairs have a ground truth label of 0 (or a small number close to 0) and different video patch pairs have a ground truth label of 1 (or a number close to 1). The network architecture is designed such that the first layers of the network extract features that are useful for determining whether the input video patches are similar or not and the last layers of the network use the features to compute a distance between the input video patches.

Figure 3:
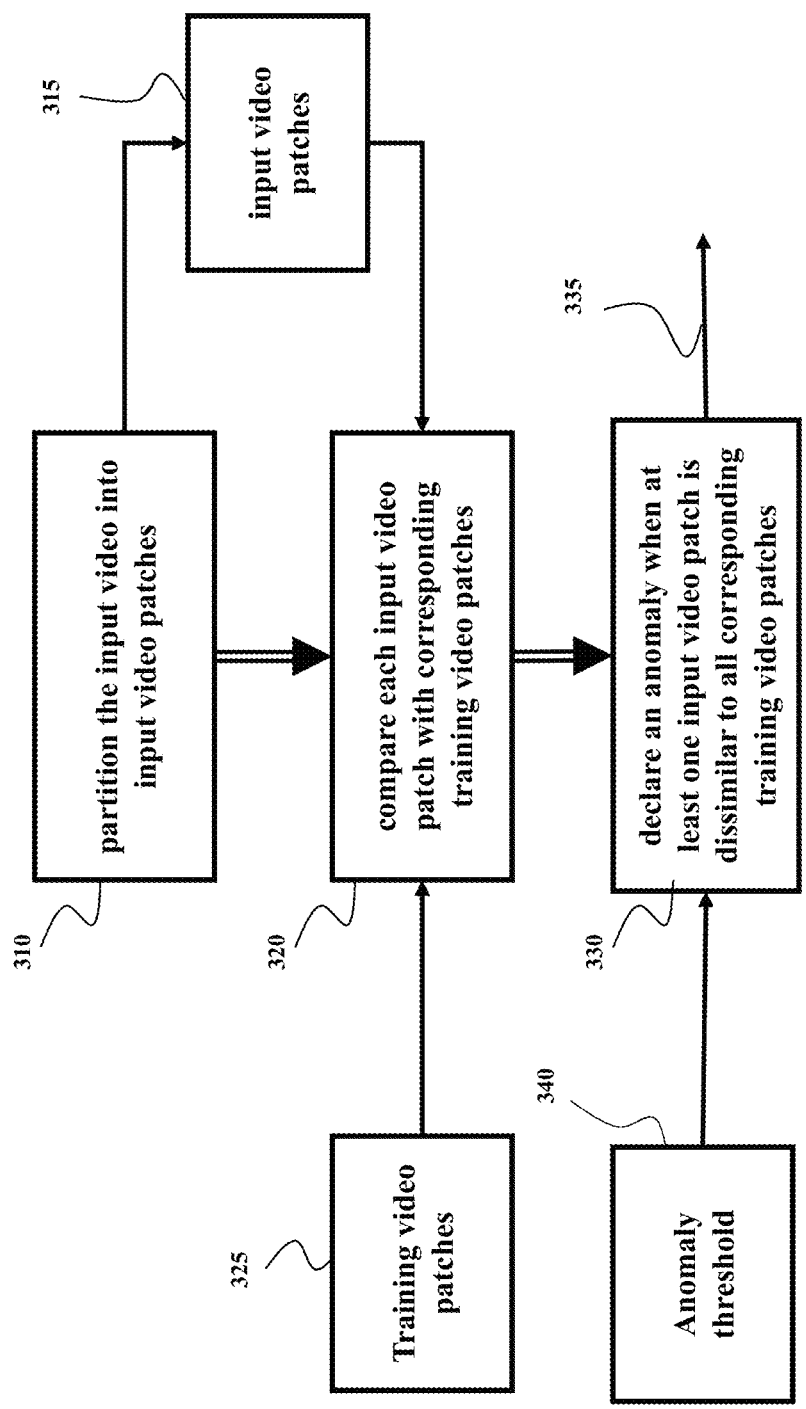
FIG. 3 shows a flow chart of a method for anomaly detection according to some embodiments.

FIG. 3 shows a flow chart of a method for anomaly detection according to some embodiments. The method can be executed by the processor 120 according to instructions stored in the memory 140. The method is configured to partition 310 the input video into input video patches 315. A video patch is a spatio-temporal region that can be defined by a bounding box in a video frame defining the spatial extent and a fixed number of frames, defining the temporal extent. Hence, the pixels of a video within a spatio-temporal region comprise a video patch. Different video patches may be overlapping. The union of all video patches covers the entire video sequence.

The method compares 320, using the neural network 135, each input video patch 315 with corresponding training video patches 325 retrieved from the storage memory 130 to determine if each input video is similar to at least one corresponding training video patch. For example, the neural network computes the distance between input video patch with each corresponding training video patch. The minimum distance, the distance to its nearest neighbor, is stored as an anomaly score of the input video patch.

The method declares 330 an anomaly 335 when at least one input video patch is dissimilar to all corresponding training video patches. For example, in step 330, each anomaly score is compared to a threshold and if the score is above a threshold then the spatio-temporal region represented by the video patch with an above-threshold anomaly score is classified as anomalous. Otherwise the region is classified as normal. For example, one embodiment is configured to detect the anomaly in the input video of the scene when at least one distance in the set of distances is greater than the anomaly detection threshold 340. The embodiment can further execute a control action in response to detecting the anomaly 335. The steps of the method are performed for each of the different input patches 315.

In such a manner, some embodiments can provide an anomaly detector suitable for direct comparison of the activities with practical computation and memory requirements suitable, e.g., for closed circuit television (CCTV) systems.

Figure 4:
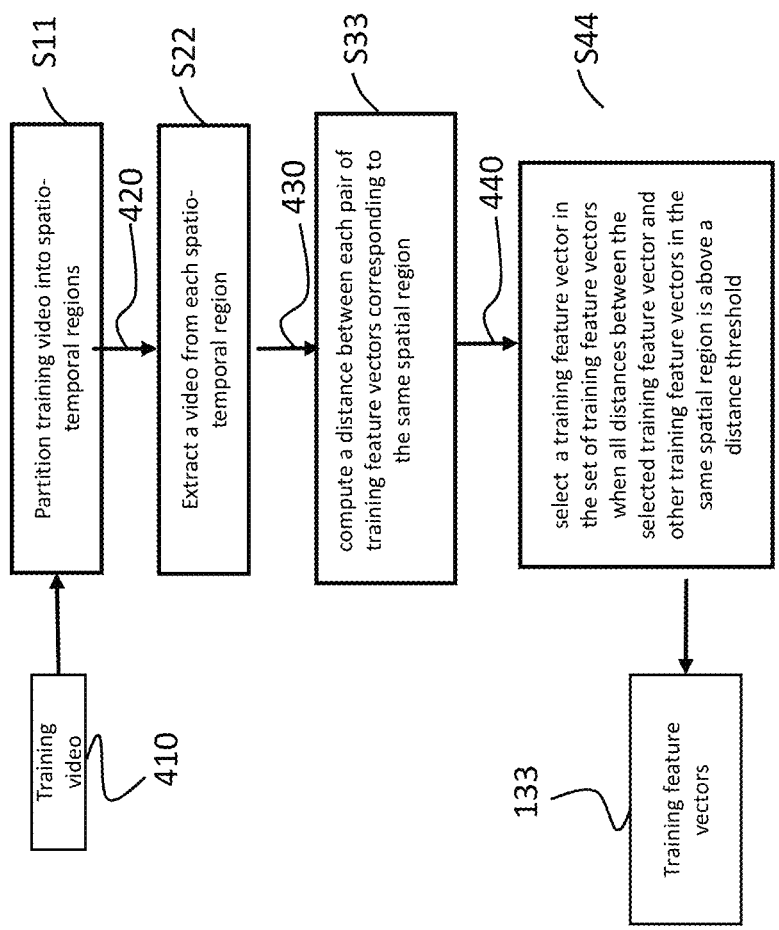
FIG. 4 shows a flow chart of a method of preparing sets of exemplars which are normal video patches extracted from spatio-temporal regions of normal video of the scene according to one embodiment.

FIG. 4 shows a flow chart of a method of preparing sets of exemplars which are normal video patches extracted from spatio-temporal regions of normal video of the scene according to one embodiment. The exemplars are considered to represent normal behavior in the scene. In other words, if the input, testing video patch is similar to an exemplar, the input video patch is considered normal. Otherwise, that input video patch is considered anomalous.

The set of exemplars are determined by analyzing normal video of the scene and selecting video patches that cover the variety of activity seen in the normal video. For example, the embodiment is configured to partition S11 the training video 410 of normal activities into the spatio-temporal regions 420 of the testing video. The dimensions of the resolution of the spatio-temporal regions of the input video corresponds to the dimensions and/or resolutions of the spatio-temporal regions 420. Next, the embodiment extracts S22 video patches 430 for each of the spatio-temporal regions in the normal video 420.

The embodiment is configured to compute S33 a distance between each pair of normal video patches corresponding to the same spatial region in the scene to produce a set of distances 440 between normal video patches. Next, the embodiment prunes similar normal video patches. Specifically, the embodiment selects S44 the exemplars representing a particular spatial region of normal video as a subset of video patches such that the subset "covers" all normal video patches for that spatial region. A subset of video patches covers a superset of video patches if the distance between each video patch in the superset and the nearest video patch in the covering subset is less than a threshold. In other words, every video patch in the superset is close to a video patch in a covering subset. The distance between video patches is computed using the neural network trained to classify pairs of video patches as similar or dissimilar. The video patches in the covering subset and/or features extracted from the video patches in the covering subset are stored 133 in the memory 130.

Some embodiments are based on another realization that the neural network itself can be further used to improve the database of normal activity. To that end, the distance between video patches is computed using a previously trained neural network 135. Specifically, in some embodiments, the database of normal activity includes only unique video patches, i.e., any two training video patches compared with the neural network are dissimilar. To that end, some embodiments remove video patches from the database of normal activity, such that all remaining video patches are dissimilar to each other and each removed video patch is similar to at least one remaining video patch. In such a manner, the memory requirement for storing the database of normal activity can be reduced without reducing the accuracy of anomaly detection.

Figure 5:
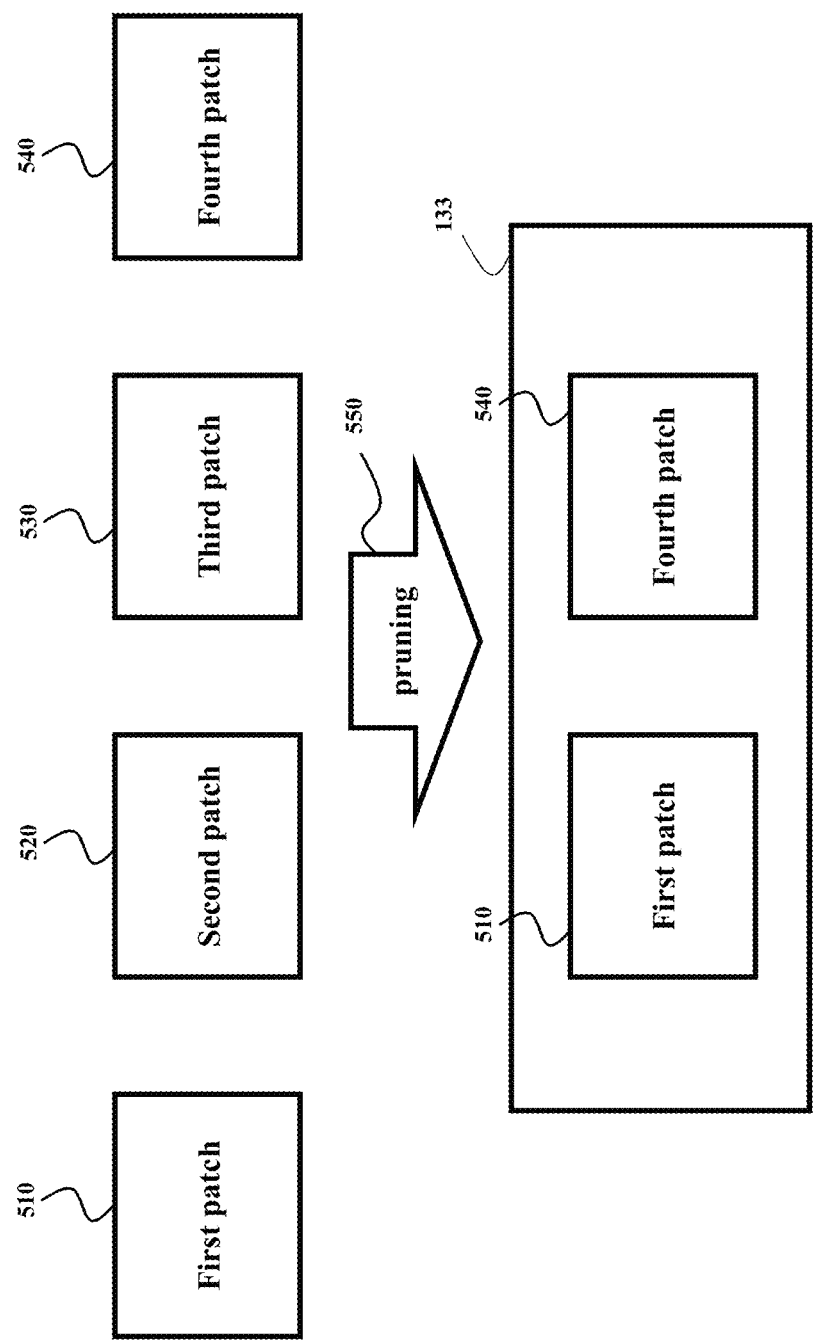
FIG. 5 shows an exemplar schematic of storing training video patches according to one embodiment.

FIG. 5 shows an exemplar schematic of storing training video patches according to one embodiment. In this example, an embodiment compares four training video patches 510, 520, 530, and 540 with each other using the neural network 135. If patches 520 and 530 are similar to other patches, e.g., to a patch 510, according to the neural network 135, those patches are pruned 550 from the stored training patches 133. If the patch 540 is different from all other patches, the patch 540 is stored in stored training patches 133. In such a manner, the training patches 13 includes only dissimilar patches, such that any two training video patches stored in the memory when compared with the neural network are dissimilar.

Some embodiments are based on a realization that a manner to extract features from videos to be compared can be also performed by a neural network. Additionally, or alternatively, some embodiments use the same neural network trained to compare video patches for extracting features from video frames that are advantageous for comparison. In such a manner, this neural network can be trained in end-to-end fashion for both feature extraction and feature comparison, which can increase the accuracy of the video comparison.

To that end, in some embodiments, each of the training video patches and input video patches are represented by feature vectors computed from the training video and the input video by the neural network trained to compute the feature vectors from different spatio-temporal patches and compare the extracted feature vectors to declare the video patches of the different spatio-temporal patches as similar or dissimilar.

Figure 6:
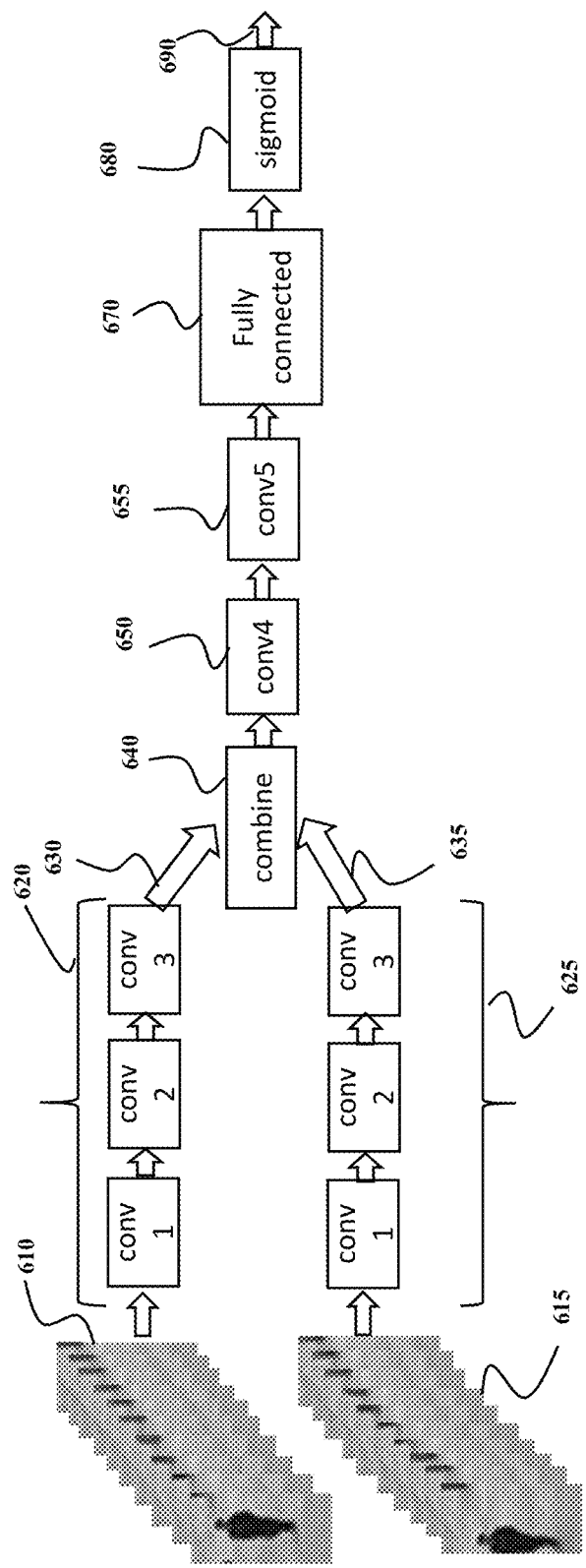
FIG. 6 shows an example of architecture of a siamese neural network used by some embodiments.

FIG. 6 shows an example of architecture of a siamese neural network used by some embodiments. This neural network extracts the feature vectors from different spatio-temporal patches and compares the extracted feature vectors to improve the performance of the anomaly detector and reduce a number of patches stored in the memory. The neural network is used to determine a distance between two video patches, both for assigning anomaly scores (the distance between a testing video patch and its closest exemplar) as well as for choosing a set of exemplars that cover the set of all normal video patches in a spatial region. The neural network takes as input two video patches 610 and 520 and outputs 690 either a distance between them or classifies them as "similar" or "different". The first three layers of the network 620 are convolutional layers which apply sets of convolutions on the input followed by a nonlinearity such as a rectified linear function or a sigmoid function. The result of these convolutional layers is a set of feature maps that contain the important information in each video patch for subsequent comparison. The weights and parameters of these convolutional layers are identical in the upper and lower sections of the network so that the same sets of features are extracted from both input video patches. The feature maps output by the last convolutional layer for the upper and lower sections are combined 640 using a simple operation such as concatenation, addition or multiplication. The combined feature maps are then passed through more convolutional layers 650, 655 (with nonlinearities) followed by a fully connected layer 670 which maps the feature maps output by convolutional layer 655 to a single floating point number. A sigmoid function 680 is then used to map this number to a floating point number between 0 and 1 representing the distance 690 between the input video patches. However, alternative embodiments use different architectures of the neural network 135.

Regardless of the network architecture, the neural network is trained on training examples consisting of pairs of video patches and the corresponding labels (same or different which can be represented by numbers such as 0 or 1). In one embodiment, the neural network is trained once on a variety of video patch pairs from many different videos and then used in a video anomaly detection system for any videos including novel videos that are different from any used during training. In some implementations, the neural network is not trained on video patches from a particular target video that it may be used on later for anomaly detection. In other words, the neural network is trained using a variety of different video so that it will be general enough to be applied to the problem of determining the similarity of novel video patches from any video.

To create video patch pairs for training a neural network, different embodiments use various strategies. For example, one embodiment creates a similar video patch pair by picking a spatio-temporal region of a video to define one video patch pair and then applying a small transformation (translation, rotation and scaling) to the spatio-temporal region to define a second similar video patch pair.

Another embodiment, given normal video that defines all normal activity for a scene along with testing video of the same scene not containing any anomalies, then any video patch of the testing video must by definition be similar to at least one video patch of the normal video from the same spatial region. The nearest normal video patch to a testing video patch can be found using a simple Euclidean distance of the raw pixels, for example.

Another embodiment, given normal video that defines all normal activity for a scene along with testing video of the same scene containing anomalies that have been annotated (for example, by a human annotator), then every anomalous video patch is by definition different from every normal video patch in the same spatial region. Thus, many possible different video patch pairs can be created from each annotated anomalous video patch.

Figure 7:
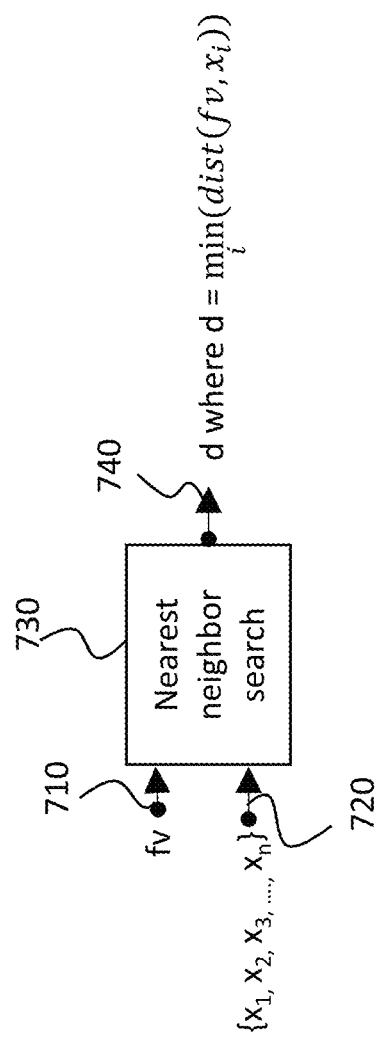
FIG. 7 shows a schematic of a nearest neighbor search method used by some embodiments to find the closest exemplar to a testing video patch.

FIG. 7 shows a schematic of a nearest neighbor search method used by some embodiments to find the closest exemplar to a testing video patch. In FIG. 7, fv 710 is the input video patch and each $x_i$ 720 is a normal video patch (exemplar). The nearest neighbor search 730 outputs the minimum distance, d, 740 between vp and the nearest $x_i$. Different embodiments use different nearest neighbor searches. For example, one embodiment uses brute force search to compare each input feature vector with each training feature vector. In some implementations, the nearest neighbor search 730 is an approximate nearest neighbor search, which is not guaranteed to find the minimum distance but may instead find a feature vector that is close to the minimum. Various nearest neighbor search algorithms known in the field could be used such as k-d trees, k-means trees, and locality sensitive hashing.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. A system for video anomaly detection, comprising:
an input interface configured to accept an input video of a scene;
a memory configured to store training video patches of a training video of the scene capturing normal activity in the scene, and
store a neural network trained to compare two video patches to declare the compared video patches as similar or dissimilar; and
a processor configured to
partition the input video into input video patches;
compare, using the neural network, each input video patch with corresponding training video patches retrieved from the memory to determine if each input video is similar to at least one corresponding training video patch, wherein each of the training video patches and input video patches is a spatio-temporal patch defined in space and time by a spatial dimension defining a region of the spatio-temporal patch in each video frame and a temporal dimension defining a number of video frames forming the spatio-temporal patch, wherein a training video patch and an input video patch of the same region are corresponding to each other; and
declare an anomaly when at least one input video patch is dissimilar to all corresponding training video patches.

2. The system of claim 1, wherein any two training video patches compared with the neural network are dissimilar.

3. The system of claim 1, wherein each of the training video patches and input video patches are represented by feature vectors extracted from the training video and the input video by a feature extracting neural network.

4. The system of claim 1, wherein each of the training video patches and input video patches are represented by feature vectors extracted from the training video and the input video by the neural network trained to extract the feature vectors from different spatio-temporal patches and compare the extracted feature vectors to declare the video patches of the different spatio-temporal patches as similar or dissimilar.

5. The system of claim 1, wherein the processor is configured to execute a control action in response to detecting the anomaly.

6. The system of claim 1, wherein the processor to determine the training video patches is configured to
partition the training video into sets of video patches, each video patch is a spatio-temporal patch defined in space and time by a spatial dimension defining a region of the spatio-temporal patch in each video frame and a temporal dimension defining a number of video frames forming the spatio-temporal patch, wherein video patches in a set of the sets of video patches correspond to the same region;
compare all video patches in each set with each other to determine similar and dissimilar video patches in each set; and
remove video patches from each set of video patches to form the training video patches, such that all remaining video patches are dissimilar to each other and each removed video patch is similar to at least one remaining video patch.

7. A method for video anomaly detection, wherein the method uses a processor coupled with stored instructions implementing the method, wherein the instructions, when executed by the processor carry out steps of the method, comprising:
accepting an input video of a scene;
retrieving from the memory training video patches of a training video of the scene capturing normal activity in the scene;
retrieving from the memory a neural network trained to compare two video patches to declare the compared video patches as similar or dissimilar;
partitioning the input video into input video patches;
comparing, using the neural network, each input video patch with corresponding training video patches retrieved from the memory to determine if each input video is similar to at least one corresponding training video patch, wherein each of the training video patches and input video patches is a spatio-temporal patch defined in space and time by a spatial dimension defining a region of the spatio-temporal patch in each video frame and a temporal dimension defining a number of video frames forming the spatio-temporal patch, wherein a training video patch and an input video patch of the same region are corresponding to each other; and
declaring an anomaly when at least one input video patch is dissimilar to all corresponding training video patches.

8. The method of claim 7, wherein any two training video patches compared with the neural network are dissimilar.

9. The method of claim 7, wherein each of the training video patches and input video patches are represented by feature vectors extracted from the training video and the input video by a feature extracting neural network.

10. The method of claim 7, wherein each of the training video patches and input video patches are represented by feature vectors extracted from the training video and the input video by the neural network trained to extract the feature vectors from different spatio-temporal patches and compare the extracted feature vectors to declare the video patches of the different spatio-temporal patches as similar or dissimilar.

11. The method of claim 7, further comprising:
executing a control action in response to detecting the anomaly.

12. A non-transitory computer readable storage medium embodied thereon a program executable by a processor for performing a method, the method comprising:
accepting an input video of a scene;
retrieving training video patches of a training video of the scene capturing normal activity in the scene;
retrieving a neural network trained to compare two video patches to declare the compared video patches as similar or dissimilar;
partitioning the input video into input video patches;
comparing, using the neural network, each input video patch with corresponding training video patches retrieved from the memory to determine if each input video is similar to at least one corresponding training video patch, wherein each of the training video patches and input video patches is a spatio-temporal patch defined in space and time by a spatial dimension defining a region of the spatio-temporal patch in each video frame and a temporal dimension defining a number of video frames forming the spatio-temporal patch, wherein a training video patch and an input video patch of the same region are corresponding to each other; and
declaring an anomaly when at least one input video patch is dissimilar to all corresponding training video patches.

13. The medium of claim 12, wherein any two training video patches compared with the neural network are dissimilar.

14. A system for video anomaly detection, comprising:
an input interface configured to accept an input video of a scene;
a memory configured to
store training video patches of a training video of the scene capturing normal activity in the scene, and
store a neural network trained to compare two video patches to declare the compared video patches as similar or dissimilar; and
a processor configured to
partition the input video into input video patches;
compare, using the neural network, each input video patch with corresponding training video patches retrieved from the memory to determine if each input video is similar to at least one corresponding training video patch; and
declare an anomaly when at least one input video patch is dissimilar to all corresponding training video patches, wherein the processor to determine the training video patches is configured to
partition the training video into sets of video patches, each video patch is a spatio-temporal patch defined in space and time by a spatial dimension defining a region of the spatio-temporal patch in each video frame and a temporal dimension defining a number of video frames forming the spatio-temporal patch, wherein video patches in a set of the sets of video patches correspond to the same region;
compare all video patches in each set with each other to determine similar and dissimilar video patches in each set; and
remove video patches from each set of video patches to form the training video patches, such that all remaining video patches are dissimilar to each other and each removed video patch is similar to at least one remaining video patch.

* * * * *